Dec. 9, 1958     J. D. STAPLES     2,863,220
LAYOUT WHEEL FOR TUBULAR CONSTRUCTIONS
Filed Jan. 23, 1956
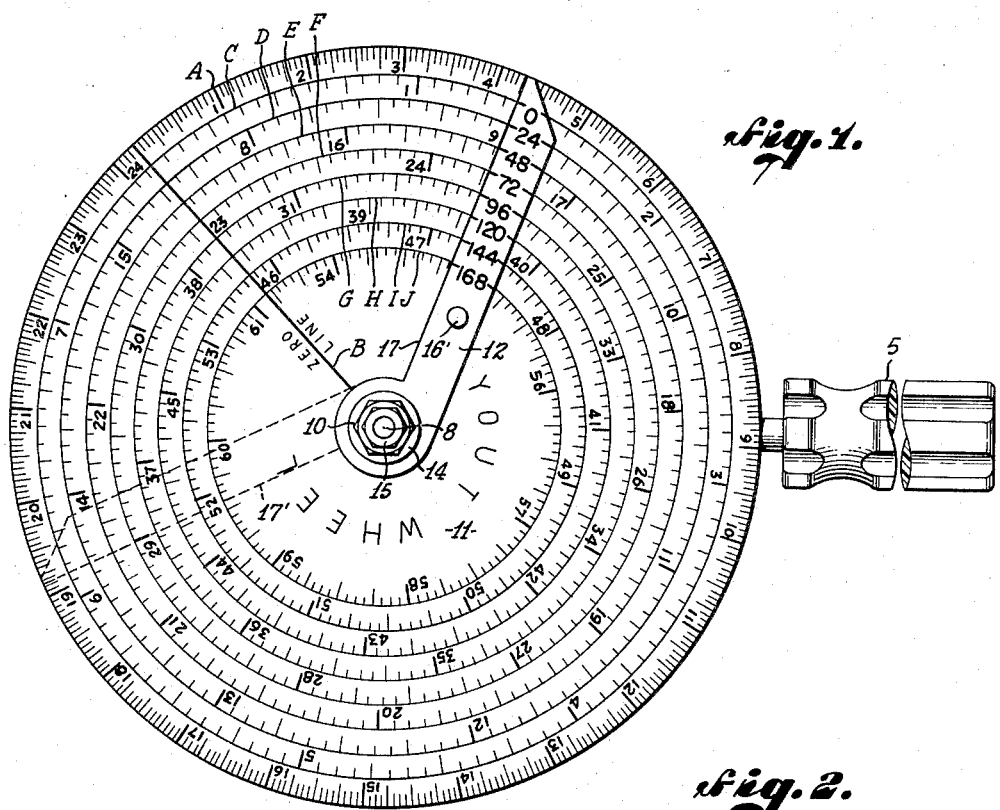
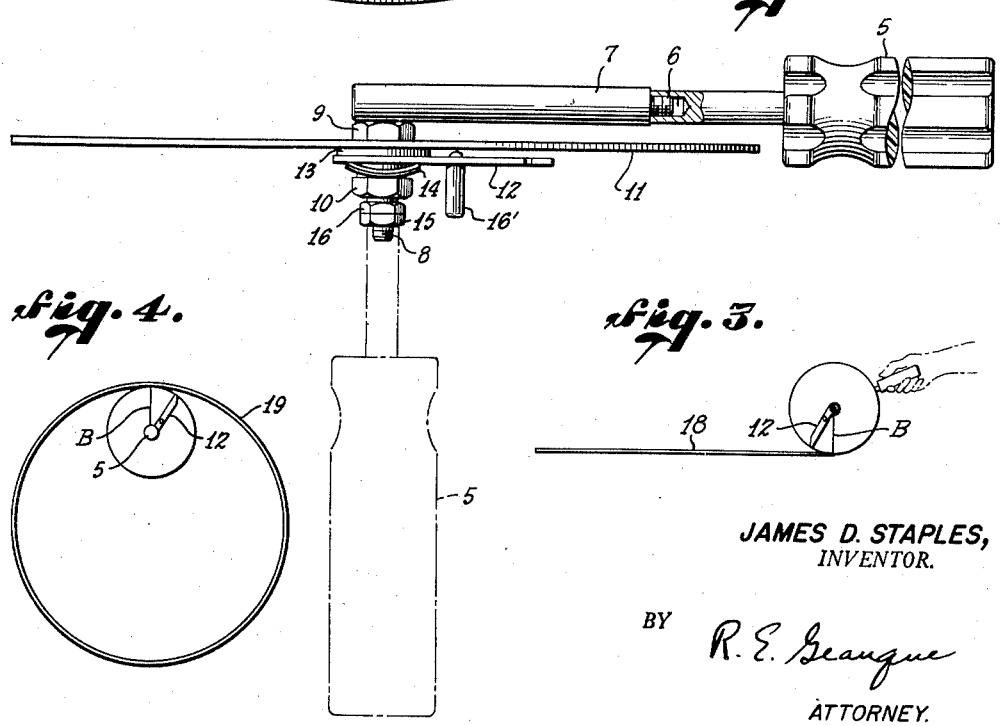
JAMES D. STAPLES,
INVENTOR.
BY R. E. Geangue
ATTORNEY.

… … …

United States Patent Office 2,863,220
Patented Dec. 9, 1958

2,863,220

LAYOUT WHEEL FOR TUBULAR CONSTRUCTIONS

James D. Staples, Bell, Calif., assignor, by Decree of Distribution, to Marguerite G. Staples Application January 23, 1956, Serial No. 560,667

3 Claims. (Cl. 33—1)

This invention relates to a layout wheel for tubular constructions and more particularly to a layout wheel having a graduated circumference for measuring and a chart and movable index on its face for rapid conversion from tube diameter to tube circumference and vice versa.

Measuring wheels of the type presently in use utilize a graduated circumference and a counter mechanism to record the number of complete revolutions of the wheel. Also, a pointer is either attached to the handle or pivoted independently of the handle and wheel in order to measure the partial rotation of the wheel. However, the face of such measuring wheels have not heretofore been utilized in connection with a pointer to supply useful information to the user of the wheel. In the case of sheet metal layout for tubular ducting and piping, the specifications generally set forth the required diameter and it is therefore necessary for the sheet metal worker to convert the diameter figure into a circumference figure so that the proper width of material can be cut. Such conversion must be either calculated for each job or obtained from handbook conversion tables. Since the conversion tables are increments, it is often necessary to extrapolate between two sets of figures to obtain a circumference for a diameter not in the tables. Obviously, present methods of making the necessary conversion are time consuming and the required figures must either be retained in the worker's mind or recorded after being obtained.

The layout wheel of the present invention provides both a measuring wheel and a conversion chart on the face of the wheel for quickly converting from diameter to circumference or from circumference to diameter. The wheel is circular in form and is calibrated in inches around its circumference. Also, the wheel contains a plurality of concentric circles which are graduate in diameter figures. A radial pointer is movable over the face of the wheel so that the side of the pointer can select the desired diameter on one of the concentric circles and the corresponding circumference can be read at the pointer on the scale around the wheel circumference. The pointer carries a figure opposite each of the concentric circles, so that the figure on the pointer opposite the diameter circle is added to the reading on the circumference scale to obtain the total circumference. Since the pointer is a permanent record of the circumference, the pointer can be left in position and rotated with the wheel. Thus, if the measurement is started at the zero line of the wheel, the required number of complete revolutions can be made and thereafter the wheel rotated to the pointer position to obtain the desired circumference layout. It is apparent that the layout wheel provides a means for quick calculation and layout of tubular constructions and gives a permanent record of the conversion figure. The scale on the circumference of the wheel can be utilized to check the circumference of ducts or pipes which have already been constructed and, of course, the conversion chart and movable index could be constructed independently of a measuring device.

It is therefore an object of the present invention to provide a layout wheel for tubular constructions which is in the form of a measuring wheel having a conversion chart and movable index on its face for calculating diameter and circumference.

Another object of the invention is to provide a layout wheel for calculating the circumference of a duct or tube from its diameter and indicating the circumference on the measuring scale of the wheel by an index pointer so that the circumference can be laid off directly from the wheel.

A further object of the invention is to provide a conversion chart having concentric circles calibrated in diameter figures and a separate circle calibrated in circumference figures, said chart being read with an index pointer which permits conversion from diameters to circumferences and vice versa.

These and other objects of the invention not specifically set forth above will become readily apparent from the accompanying description and drawings in which:

Figure 1 is a side elevation view of the layout wheel of the invention showing the conversion chart and movable index pointer.

Figure 2 is a top plan view of the layout wheel showing the manner in which the wheel and pointer are carried by the handle.

Figure 3 is a diagrammatic view illustrating the manner in which the wheel is utilized to layout a circumference.

Figure 4 is a diagrammatic view illustrating the manner in which the wheel is utilized to measure a circumference.

Referring to Figure 2, the layout wheel has a handle 5 with a threaded opening to receive threaded extension 6 of arm 7. A threaded shaft 8 extends from arm 7 and receives spaced nuts or stop members 9 and 10 which are positioned on opposite sides of wheel 11 and pointer 12. The wheel 11 and pointer 12 have central openings for shaft 8 and these members are separated by a non-metallic washer 13. The index pointer 12 is held against the washer 13 by spring washers 14 compressed by nut 10. A pair of lock nuts 15 and 16 are located on the end of shaft 8 adjacent nut 10 in order to hold nut 10 in position and maintain the proper spring force of washer 14. Because of this construction, the wheel 11 and pointer 12 will rotate together about shaft 8 when the wheel is moved along a surface by handle 5. Also, the index pointer 12 carries a pin 16' for manually moving the pointer around the face of wheel 11. Since the threaded end of shaft 8 projects beyond the lock nut, the handle 5 can be detached from arm 7 and secured to the end of shaft 8 in the manner illustrated by the phantom line position of the handle in Figure 2.

Referring to Figure 1, the outer circumference of wheel 11 is marked off into a scale A having twenty-four increments of one inch each so that the wheel will travel a distance of two feet upon each complete revolution. The scale A has a zero line B from which the measurements are initiated. Spaced inwardly from scale A are scales C through J which are concentric with each other about the axis of the wheel and are divided off into increments of diameter. For instance, scale C covers diameter from one inch to more than seven inches and scale D picks up from scale C and includes diameters from more than 7 to over 15 inches. In the same manner, each inner scale picks up from the end of the outer adjacent scale so that numerals 16–22 are included on scale e, 23–30 on scale F, 31–38 on scale G, 39–45 on scale H, 46–53 on scale I and 54–61 on scale J. It will be noted the consecutive numerals move from an outer scale to the next inner scale as the scale lines run into the zero line B.

The longer side 17 of pointer 12 is located on a radial line through axis 8 and the edge 17 is utilized to select a diameter figure on scales C through J. The numerals on the scales are placed in front of the scale graduations so that the numeral in front of edge 17 will not be covered by the pointer. The surface of pointer 12 carries numerals opposite each of the scales located below the pointer so that numerals 0, 24, 48, 72, 96, 120, 144 and 168 are located above scales C, D, E, F, G, H, I, and J, respectively. Thus, the numerals on the surface of the pointer increase by 24 in moving from one scale to the next innermost scale and this increase of 24 corresponds with the total length of outer scale A.

The operation of the layout wheel will now be described in connection with the two examples shown in Figure 1. In the first example illustrated by the full line position of pointer 12, it is desired to determine the circumference required to produce a duct or pipe of 9 inch diameter. The edge 17 of the pointer is positioned opposite numeral 9 on scale D and the end of the pointer reads 4.3 at scale A. The numeral 24 appearing on the surface of pointer 12 opposite scale D is then added to the value on scale A to obtain a value of 28.3 inches for the circumference. With the pointer in this position (see Figure 3), it is possible to directly lay off the width of material 18 required to produce a 9 inch diameter duct. The zero line B is located at the edge of the material and the wheel is moved forward over the material when one complete revolution so that the zero line B is again at the material surface. This movement of the wheel will have measured off 24 inches of material. Thereafter, the wheel is moved forward until pointer 12 is opposite the material so that 4.3 inches more have been measured off making a total measurement of 28.3 inches. The material 18 can then be marked at pointer 12 and cut for fabrication of the duct. It will thus be seen that since the numerals read on the surface of pointer 12 are divisible by 24, the number of revolutions of the wheel required prior to stopping of the wheel at the pointer can be determined.

It is understood that instead of determining a circumference from a given diameter, the conversion chart on wheel 11 can be used to determine a diameter from a given circumference. For instance, if it were desired to determine the diameter of a duct having a 28.3 inch diameter, the pointer 12 would be set at 4.3 on scale A and the diameter, namely 9 inches, would be read on the scale opposite the numeral 24, namely on scale D. Thus, the procedural steps in using the conversion chart are reversed and for any given circumference, the figure is divided into two figures the first being less than 24 and the second being a multiple of 24. The first figure is set at edge 17 on scale A and the diameter is read opposite the second figure on the surface of the pointer.

In the second example, the dashed position of pointer 12 is located to determine the circumference of a duct having a 29 inch diameter. The dashed edge 17' is shown opposite the numeral 29 on scale F and the pointer reads 19.1 on scale A. Since the number 72 appears opposite the scale F on the surface of pointer 12, this number is added to 19.1 to obtain a circumference of 91.1 inches. In laying off this circumference in the manner illustrated in Figure 3, the wheel would make 3 complete revolutions from the zero line B prior to rotation of the wheel to the pointer 12. It is understood that the scales can be read to about the first decimal place and that such accuracy is sufficient in the layout of ducting or piping. In the event the duct material is to be overlapped, the overlapped distance can be added to the circumference by moving the pointer the distance of the overlap or the overlap can be measured off separately by scale A after the circumference is laid off.

In Figure 4, the handle 5 has been attached to shaft 8 in order to measure the inner circumference of completed duct 19. With the handle in this position, the handle can be moved in a circular path around the circumference without interference from the duct and the view of the zero line will not be interrupted. In such a measurement, the zero line is positioned at a selected starting point and the wheel is rotated until it again meets the starting point. The reading on scale A at the starting point will give the circumference and, of course, this reading must be increased by 24 for each complete revolution of the wheel. An accurate reading of scale A can be obtained by moving pointer 12 opposite the starting point after the wheel has reached the point. Of course, the handle 5 can be used in either of it positions in layout of circumference on flat material.

By the present invention, a novel layout wheel is provided for use in the construction of tubes and ducts. While the calculation chart and a pointer could be constructed and used independently of wheel 11, the application of these elements to the face of the wheel provides not only numeral readings but also, a pointer indication for use in the layout of material. It is understood that the manner in which the layout wheel is rotatively mounted and attached to the handle provides for two handle positions. However, other constructions can be utilized for supporting the wheel and handle. Also, the components of the layout wheel can be constructed of any suitable material, such as metal, plastic, etc. Various other modifications are contemplated by those skilled in the art without departing from the spirit and scope of the invention.

What is claimed is:

1. A layout wheel for tubular constructions comprising a wheel rotatably supported by a handle, a distance measuring scale on the circumference of said wheel, a plurality of concentric circles on the face of said wheel graduated into consecutive diameter figures, and an index pointer rotatably mounted about the axis of said wheel, said index pointer carrying a numeral opposite each of the concentric circles, each of said numerals being multiples of the distance measured by one complete revolution of the wheel and the numeral opposite each circle representing the quantity to be added on the reading on the distance scale to total a given circumference figure, the diameter to the given circumference figure being read on the circle opposite the added quantity.

2. A layout wheel for tubular constructions comprising a wheel rotatably mounted by a handle, a distance measuring scale, having a zero reading, on the circumference of said wheel, a plurality of concentric circles on the face of said wheel graduated into consecutive diameter figures, a radial zero line on the face of said wheel connecting the zero reading on the distance measuring scale with the center of said wheel, the consecutive diameter figures on said concentric circle moving from one circle to the next adjacent circle at said zero line, and an index pointer rotatably mounted about the axis of said wheel, said index pointer carrying a numeral opposite each of said concentric circles and each of said numerals being an indication of the number of the complete rotations of the wheel required prior to moving said wheel to the pointer position on said distance scale to lay off the corresponding circumference.

3. A layout wheel for tubular constructions comprising a shaft having threaded end portions, a measuring wheel rotatively mounted on said shaft, two stop members threadably received on said end portions for confining axial movement of said measuring wheel on said shaft, a distance scale on the circumference of said wheel having a zero indication, a pointer rotatively mounted on said shaft at one side of said wheel, spring means positioned between said pointer and one of said stop members to normally cause said pointer to rotate with said wheel and to permit said pointer to be moved relative to said wheel to indicate a value on said scale, the rotation of said pointer with said wheel providing means for measuring off distances less than one revolution of said wheel, and a support arm having a pair of threaded openings in normal relation formed adjacent one end thereof so that said support arm can be threadably received by one end portion of said shaft and positioned parallel with or normal to said wheel.

References Cited in the file of this patent

UNITED STATES PATENTS

| | | | |
|---|---|---|---|
| 66,120 | Bigelow | June 25, | 1867 |
| 135,185 | Way | Jan. 21, | 1873 |
| 399,966 | Buchanan | Mar. 19, | 1889 |
| 1,291,485 | Grover | Jan. 14, | 1919 |
| 1,437,298 | Fickert | Nov. 28, | 1922 |
| 1,718,052 | Lineaweaver | June 18, | 1929 |
| 2,262,664 | Bresson | Nov. 11, | 1941 |
| 2,677,891 | Hansen | May 11, | 1954 |

FOREIGN PATENTS

| | | | |
|---|---|---|---|
| 83 | Great Britain | Jan. 7, | 1881 |
| 14,629 | Great Britain | June 11, | 1903 |
| 288,412 | Great Britain | Apr. 12, | 1928 |

OTHER REFERENCES

Pages 111, 112 and 113 of "The Mechanical Engineer's Pocket Book," 8th edition, 1910, published by John Wiley and Sons, New York.